United States Patent
Bendien et al.

(10) Patent No.: US 12,046,908 B2
(45) Date of Patent: Jul. 23, 2024

(54) ELECTRICITY SUPPLY SYSTEM

(71) Applicants: Johan Bendien, Birkenau (DE); Martin Pölöskey, Neuss (DE)

(72) Inventors: Johan Bendien, Birkenau (DE); Martin Pölöskey, Neuss (DE)

(*) Notice: Subject to any disclaimer, the term of this patent is extended or adjusted under 35 U.S.C. 154(b) by 0 days.

(21) Appl. No.: 18/165,633

(22) Filed: Feb. 7, 2023

(65) Prior Publication Data

US 2023/0253797 A1 Aug. 10, 2023

(30) Foreign Application Priority Data

Feb. 10, 2022 (EP) .................... 22156176

(51) Int. Cl.
*H02J 3/38* (2006.01)
*G05B 19/042* (2006.01)
*H02J 3/00* (2006.01)

(52) U.S. Cl.
CPC ............ *H02J 3/381* (2013.01); *G05B 19/042* (2013.01); *H02J 3/003* (2020.01); *H02J 3/004* (2020.01);
(Continued)

(58) Field of Classification Search
CPC .. H02J 3/381; H02J 3/003; H02J 3/004; H02J 2300/24; H02J 2300/28; H02J 2203/20; H02J 2300/20; H02J 1/14; H02J 3/38; H02J 7/34; H02J 1/102; G05B 19/042; G05B 2219/2639
See application file for complete search history.

(56) References Cited

U.S. PATENT DOCUMENTS 10,673,241 B2 * 6/2020 Nakayama ............... H02J 3/381
10,714,974 B2 * 7/2020 Clifton .................... H02J 15/00
(Continued)

FOREIGN PATENT DOCUMENTS

DE 102014113240 A1 3/2016

OTHER PUBLICATIONS

Choudhury, A comprehensive review on issues, investigations, control and protection trends, technical challenges and future directions for Microgrid technology, Int Trans Electr Energ Syst. 2020;30:e12446. Dec. 10, 2019.
(Continued)

*Primary Examiner* — Ziaul Karim
(74) *Attorney, Agent, or Firm* — Nemphos Braue LLC; Michael Antone (57) ABSTRACT

A controller for a DC microgrid and associated renewable energy source, RES, units. The DC microgrid comprises energy storage, ES, units and consumer units that are interconnected by a DC distribution network. The DC microgrid is connected to an AC grid to allow power to flow between the DC microgrid and the AC grid. The controller has three levels: a first for controlling daily operations, a second for making optimizing adjustments to the first level control based on historical data and the weather forecast, and a third which is an analysis level for modelling how changes in provision of the number of RES units and ES units would affect the DC microgrid's dependency on power from the AC grid. The output of the third level thus enables incremental changes to be made to provision in order to reduce, ideally eliminate, the net power demand from the AC grid.

15 Claims, 6 Drawing Sheets

(52) U.S. Cl.
CPC ... *G05B 2219/2639* (2013.01); *H02J 2300/24* (2020.01); *H02J 2300/28* (2020.01)

(56) References Cited

U.S. PATENT DOCUMENTS

| | | | |
|---|---|---|---|
| 2008/0040263 A1* | 2/2008 | Pollack | B60L 53/14 |
| | | | 705/39 |
| 2009/0066287 A1* | 3/2009 | Pollack | H02J 13/00028 |
| | | | 180/65.21 |
| 2010/0076615 A1* | 3/2010 | Daniel | H02S 50/00 |
| | | | 703/2 |
| 2016/0301213 A1* | 10/2016 | Daniel | H02J 13/00034 |
| 2016/0363948 A1* | 12/2016 | Steven | G06Q 10/00 |
| 2017/0179847 A1 | 6/2017 | Porter | |
| 2018/0358839 A1 | 12/2018 | Perez | |
| 2021/0218249 A1* | 7/2021 | Dong | B60L 53/52 |
| 2021/0221247 A1* | 7/2021 | Daniel | H02J 3/008 |
| 2022/0029424 A1* | 1/2022 | Burra | H02J 13/00001 |

OTHER PUBLICATIONS

Nakayama & Sharma, Demand Charge and Response with Energy Storage, 2018 IEEE International Conference on Communications, Control, and Computing Technologies for Smart Grids (SmartGridComm).

* cited by examiner

ELECTRICITY SUPPLY SYSTEM

STATEMENT REGARDING FEDERALLY SPONSORED RESEARCH OR DEVELOPMENT

Not Applicable

CROSS-REFERENCE TO RELATED APPLICATIONS

This application claims priority to and the benefit of EP Patent Application No. 22156176.4 filed on 2022 Feb. 10, the disclosure of which is incorporated by reference in its entirety.

BACKGROUND OF THE INVENTION

Field of the Invention

The present disclosure relates to an electricity supply system and its control, more particularly to controlling a direct current (DC) network that supplies a group of consumer units with electricity generated locally by renewable sources.

Background

A traditional national electricity supply system is based on the so-called national grid which is an alternating current (AC) network that serves to supply essentially all consumer units in a country or region, including private households, commercial buildings and industrial plants, with electricity that has been generated in large power stations, which form part of a country's national infrastructure. Typically, these will be coal-fired power stations, gas-fired power stations, nuclear power stations and hydroelectric power stations. Each large power station may generate sufficient AC power to supply tens of thousand, hundreds of thousand or even several million homes. In Germany, France and other continental European countries, for example, the national grid consists of first and second low voltage supplies at 230 V and 400 V respectively, i.e. single phase and three phase. In the United Kingdom, these voltages are 230 V and 415 V; China: 220 V and 380 V; Japan 100 V and 200 V; and United States of America 120 V and various local values for three phase supply.

In the future, the electricity supply system may increasingly rely on local DC distribution networks, referred to as microgrids, which serve to supply a small number of consumer units. The number of consumer units may be very small, e g less than ten, or may be up to a few hundred or a few thousand covering a small community or an industrial park. In a microgrid, the electricity is predominantly generated locally by the microgrid's own renewable energy source (RES) units. The concept of a microgrid is implicitly associated with the idea that the microgrid's RES units are 'clean', e.g. zero or low carbon generators, whereas at least some of the AC power generators associated with the national grid are assumed to be 'dirty', e.g. coal etc. In some countries, another driver for microgrids may be to shield consumers from unreliability of the national grid. The RES units of the microgrid may be one or more of: wind turbines, solar panels, hydroelectric (so-called mini or micro hydro schemes) or biogas fermenters (sometimes called biogas digesters) based respectively on wind, sun, water flow and biogas from organic waste. The intermittent nature of at least wind and solar electricity generators also necessitates that the microgrid has energy storage (ES) units, i.e. batteries, to store sufficient charge to supply the consumer units over periods when there is no sun, in particular the night time, or insufficient wind.

A microgrid is connected to the national grid via an interface. An interface connection to the national grid may not only be technically desirable but may also be mandated by law. Supplying power from the national grid to the microgrid via the interface ensures security of supply to the microgrids consumer units, e.g. to compensate for any shortfall in local supply through its RES units. The interface is in most cases bi-directional so that the microgrid can deliver any excess electrical power generated by its RES units to the national grid, e.g. excess wind or solar power on particularly windy or sunny days.

A microgrid is controlled by a suitable controller which controls not only its RES units and ES units but also the supply of electricity between the microgrid and the national grid. The microgrid provider will have some kind of contractual agreement with a national grid electricity supply company to specify how much power the national grid guarantees to make available to the microgrid. The contractual agreement may specify the average amount of power that is to be made available to the DC microgrid by the AC national grid, e.g. on average over a day, week, month or other period, as well as peak power limits, e.g. the maximum current that can be drawn by the microgrid from the national grid at any one moment in time. The contractual agreement will also specify conditions relating to electricity supplied from the microgrid to the national grid, e.g. when and under what conditions supply of power from the microgrid will be accepted. The contractual agreement between the microgrid provider and the electricity supply company therefore imposes technical boundary conditions on the control of the microgrid by defining the peak and average amounts of power that the DC microgrid is able to take from the AC national grid. The microgrid controller should therefore be sensitive to these technical boundary conditions.

A microgrid controller needs to provide suitable control for the DC distribution network including management of the AC national grid connection, so that the microgrid operates in a stable and efficient way while ensuring security of supply to the consumer units and while meeting its environmental goals.

BRIEF SUMMARY OF THE INVENTION

According to one aspect of the disclosure, there is provided an electricity supply system comprising: a DC distribution network; a plurality of energy storage, ES, units which are operable to be charged with direct current from the DC distribution network and to discharge direct current to the DC distribution network; an AC grid interface connecting the DC distribution network to an external AC grid, the AC grid interface being configured to enable the DC distribution network to take electrical power from the AC grid; a plurality of consumer units comprising low power consumer, LPC, units and high power consumer, HPC, units; and a plurality of RES units. A controller is provided for controlling the DC distribution network, the controller having a short-term time frame, STF, control level for controlling daily operations, a medium-term time frame, MTF, control level for making adjustments to the STF control level taking account of predicted supply and demand fluctuations from the RES units and the consumer units respectively, and a long-term time frame, LTF, analysis level for modelling changes in provision of at least one of the RES units, the ES units, and the consumer units.

The STF control level is configured to control daily operations according to: predicted RES unit power generation as a function of time over the day; and predicted demand for power from the LPC units and the HPC units over the day; in order to satisfy demand from the consumer units as far as possible from the RES units and the ES units rather than from the AC grid while maintaining a specified minimum amount of charge in the ES units, if needed by taking electrical power from the AC grid via the AC grid interface; satisfy requested instantaneous demand from the LPC units at all times; and satisfy requested instantaneous demand from the HPC units over the day conditionally based on the predicted RES unit power generation and the state of charge of the ES units; while minimizing average daily electrical power taken from the AC grid.

The MTF control level is configured to make adjustments to the STF control level: by providing the STF control level with the predicted RES unit power generation on a daily basis as a function of time over the day; and by providing the STF control level with the predicted demand for power from the LPC units and from the HPC units, wherein the predicted demand for power from the LPC units is adjusted based on a computational analysis of actual satisfied demand from the LPC units on previous days and taking account of daily variations within a week, and wherein the predicted demand for power from the HPC units is adjusted from day to day based on a computational analysis of actual satisfied demand from the HPC units on previous days (and optionally unsatisfied demand from the HPC units) and taking account of daily variations within a week.

The LTF analysis level is configured to model possible changes to the DC distribution network to analyse adequacy of provision by the ES units and the RES units for satisfying demand from the LPC units and the HPC units. This is done by modelling the effect of varying the number of ES units and RES units on the amount of electrical power taken from the AC grid taking account of values for: satisfied demand from the LPC units; and satisfied demand from the HPC units (optionally including unsatisfied demand); taking account of daily, weekly and monthly variations thereof. The modelling may optionally include a different number of LPC units and HPC units to those that constitute the DC distribution network. The model output is one or more scenarios with changes in the number of ES units and the number of RES units showing for each scenario the amounts of electrical power taken from the AC grid over a period of at least two months, preferably at least a year. The amounts may be shown on a daily, weekly and/or monthly basis.

In certain embodiments, the external AC grid presents a grid voltage to the interface, and wherein the interface connecting the DC distribution network to the external AC grid comprises an inverter having an output voltage that is controlled by the controller to vary between above and below that of the grid voltage selectively to cause current to be drawn from the DC distribution network through the inverter when the inverter output voltage is greater than the grid voltage and to cause current to be drawn from the external AC grid when the inverter output voltage is less than the grid voltage. In particular, the LPC units may comprise AC appliances and wherein the inverter may be configured to supply current from the external AC grid to the AC appliances of the LPC units when the inverter output voltage is less than the grid voltage, and to supply current from the DC distribution network to the AC appliances of the LPC units when the inverter output voltage is greater than the grid voltage. For at least one mode of operation, the interface is configurable by the controller so that current is supplied to the external AC grid from the DC distribution network through the inverter when the inverter output voltage is greater than the grid voltage. For at least one other mode of operation, the interface is configurable by the controller so that current is drawn from the external AC grid into the DC distribution network through the inverter when the inverter output voltage is less than the grid voltage. In certain embodiments, the DC distribution network comprises a switch network operable to control DC current flow within the DC distribution network, the switch network comprising a plurality of switches that are set in an open position or a closed position responsive to a control signal received from the controller.

The disclosure in a related aspect also provides a corresponding controller for controlling a DC distribution network of the above kind, the controller comprising an STF control level, a MTF control level and a LTF analysis level which are each as specified above for the electricity supply system.

According to another aspect of the disclosure, there is provided an electricity supply system comprising: a DC distribution network; a plurality of energy storage, ES, units which are operable to be charged with direct current from the DC distribution network and to discharge direct current to the DC distribution network; an AC grid interface connecting the DC distribution network to an external AC grid, the AC grid interface being configured to enable the DC distribution network to take electrical power from the AC grid; a plurality of consumer units comprising low power consumer, LPC, units and high power consumer, HPC, units; and a plurality of RES units. A controller is provided for controlling the DC distribution network, the controller having a short-term time frame, STF, control level for controlling daily operations and a medium-term time frame, MTF, control level for making adjustments to the STF control level taking account of predicted supply and demand fluctuations from the RES units and the consumer units respectively.

In this aspect of the disclosure, the STF control level is configured to control daily operations according to: predicted RES unit power generation as a function of time over the day; predicted demand for power from the LPC units and from the HPC units over the day; and a time-varying target value for the specified minimum amount of charge to be maintained in the ES units, which varies over the day; in order to satisfy demand from the consumer units as far as possible from the RES units and the ES units rather than from the AC grid while maintaining a specified minimum amount of charge in the ES units, if needed by taking electrical power from the AC grid via the AC grid interface; satisfy requested instantaneous demand from the LPC units at all times; and satisfy requested instantaneous demand from the HPC units over the day conditionally based on the predicted RES unit power generation and the state of charge of the ES units; while minimizing average daily electrical power taken from the AC grid.

In this aspect of the disclosure, the MTF control level is configured to make adjustments to the STF control level: by providing the STF control level with the predicted RES unit power generation on a daily basis as a function of time over the day; by providing the STF control level with the predicted demand for power from the LPC units and from the HPC units, wherein the predicted demand for power from the LPC units is adjusted based on a computational analysis of actual satisfied demand from the LPC units on previous days and taking account of daily variations within a week, and wherein the predicted demand for power from the HPC units is adjusted from day to day based on a computational analysis of actual satisfied demand from the HPC units on previous days (and optionally unsatisfied demand from the HPC units) and taking account of daily variations within a week; and by providing the STF control level with the time-varying target value for the specified minimum amount of charge to be maintained in the ES units that minimizes average daily electrical power taken from the AC grid while taking account of the predicted demand for power from the LPC units and from the HPC units.

The disclosure in a related aspect also provides a corresponding controller for controlling a DC distribution network of the above kind, the controller comprising an STF control level, a MTF control level and a LTF analysis level which are each as specified above for the electricity supply system.

In certain embodiments, the STF control level is configured to control daily operations to satisfy demand from the consumer units as far as possible directly from power being generated by the RES units rather than by drawing power from the ES units.

In certain embodiments, the MTF control level is configured to determine the predicted RES unit power generation taking account of a weather forecast for the day.

In certain embodiments, the HPC units are subdivided into electric vehicle charging points and other HPC units, with demand for power being subdivided correspondingly in each of the STF, MTF and LTF control and analysis levels.

In certain embodiments, the interface connecting the DC distribution network to an external AC grid is additionally configured to enable the DC distribution network to supply direct current as electrical power to the AC grid.

In the LTF analysis level, the amount of electrical power taken from the AC grid may be computed by the LTF analysis level is a net amount taking account also of electrical power supplied to the AC grid from the RES units.

The MTF control level may be additionally configured to calculate a predicted demand for power from the AC grid over the day. Moreover, in the MTF control level, the predicted demand for power from the AC grid over the day may be adjusted based on a computational analysis of actual demand for power from the AC grid on previous days and taking account of daily variations within a week.

In some implementations of the system, the RES units are connected to supply direct current to the DC distribution network, i.e. are components of the DC distribution network. In other implementations, some or all of the RES units are geographically dislocated from the DC distribution network and are connected to the AC grid independently of the DC distribution network, so as to supply their generated power directly to the AC grid.

In a still further aspect of the disclosure, there is provided an electricity supply system comprising: a DC distribution network; a plurality of energy storage, ES, units connected to the DC distribution network via DC/DC interfaces and which are operable to be charged with direct current from the DC distribution network and to discharge direct current to the DC distribution network via their DC/DC interfaces; a plurality of consumer units connected to the DC distribution network via one or more DC/DC or DC/AC interfaces depending on whether they are DC or AC devices, the consumer units comprising low power consumer, LPC, units and high power consumer, HPC, units; a plurality of renewable energy source, RES, units; a controller for controlling the DC distribution network; and an AC grid interface connecting the DC distribution network to an external AC grid which presents a grid voltage to the AC grid interface, the AC grid interface being configured to enable the DC distribution network to take electrical power from the AC grid, wherein the AC grid interface connecting the DC distribution network to the external AC grid comprises an inverter having an output voltage that is controlled by the controller to vary between above and below that of the grid voltage selectively to cause current to be drawn from the DC distribution network through the inverter when the inverter output voltage is greater than the grid voltage and to cause current to be drawn from the external AC grid when the inverter output voltage is less than the grid voltage.

BRIEF DESCRIPTION OF THE DRAWINGS

In the following, the present invention will further be described by way of example only with reference to exemplary embodiments illustrated in the figures, and not for purposes of limiting the invention.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
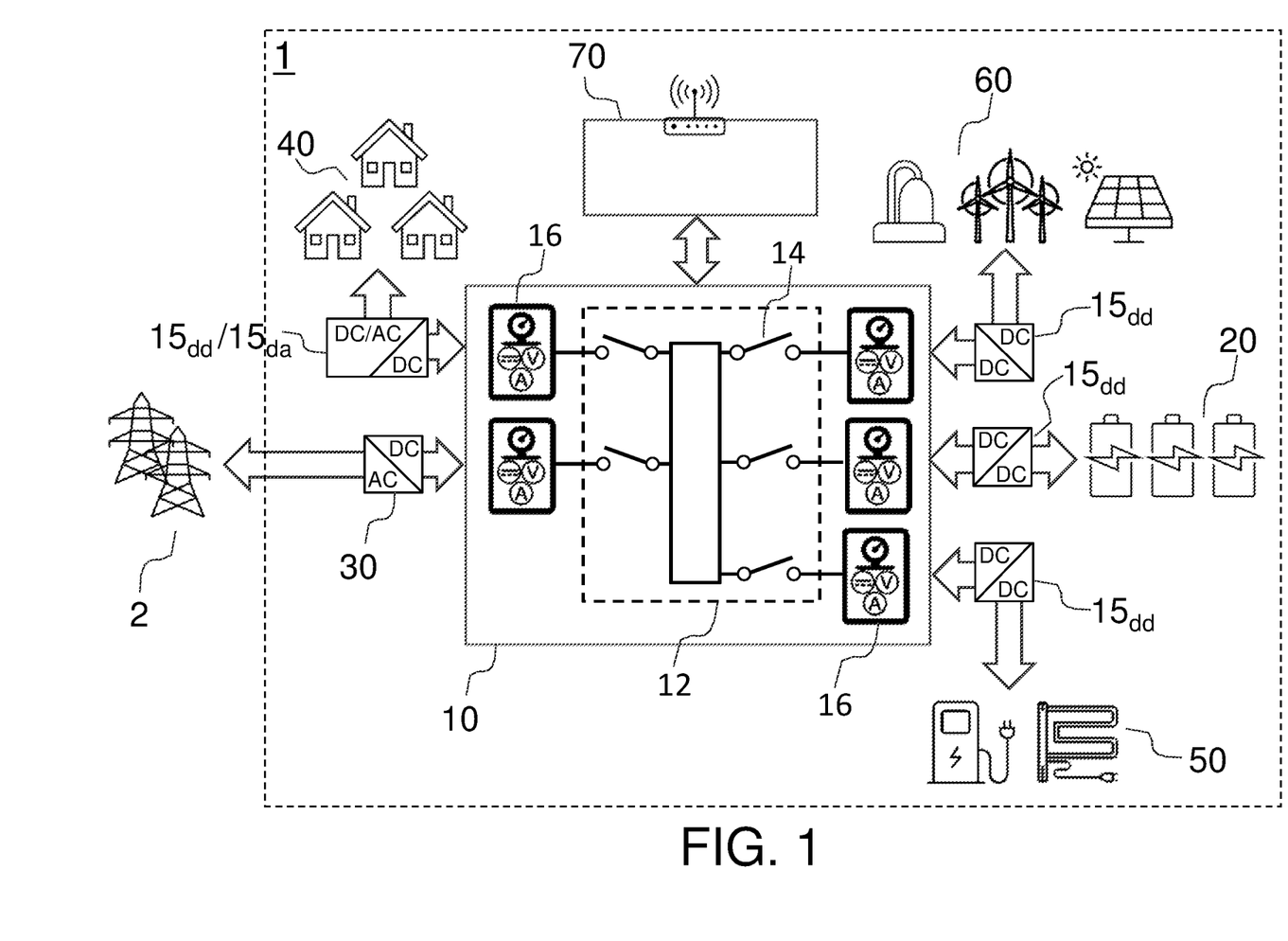
FIG. 1 is a schematic diagram of a microgrid electricity supply system according to an embodiment of the invention.

FIG. 1 is a schematic diagram of a microgrid electricity supply system 1 according to an embodiment of the invention. The microgrid electricity supply system 1 comprises a DC distribution network 10 that interconnects and distributes DC current between the components of the microgrid with respective DC/DC 15*dd* and DC/AC interfaces 15*da*, wherein a DC/AC interface may be termed an inverter following standard usage in the art. The DC distribution network 10 components include a plurality of renewable energy source (RES) units 60 and a plurality of energy storage (ES) units 20, typically batteries as well as a plurality of consumer units 40, 50. The DC distribution network 10 additionally connects to an external AC grid 2, i.e. typically the national grid, through a DC/AC interface 30, so that current can flow from the AC grid 2 into the DC distribution network 10 and, in most cases, also in the opposite direction from the DC distribution network 10 to the AC grid 2. The DC/AC grid interface 30 is thus reconfigurable to enable the DC distribution network 10 either to take electrical power from the AC grid 2 or to supply electrical power to the AC grid 2, i.e. the grid interface 30 will in most cases be bi-directional. The RES units 60 may include ones based on at least one of: wind, solar energy, water and biogas as schematically illustrated. The ES units 20 are operable to be charged with direct current from the DC distribution network 10 and to discharge direct current into the DC distribution network 10. The consumer units 40, 50 can be sub-classified into low power consumer (LPC) units and high power consumer (HPC) units. LPC units 40 include households or office buildings with usual household appliances and office equipment as used in homes and office buildings respectively. Household appliances and office equipment will generally run on AC, so the interface from the DC distribution network 10 to the LPC units 40 will be a DC/AC interface 15da. It may also be the case that an LPC unit has a mix of AC and DC appliances or equipment, in which case the interface will include both a DC/DC interface 15dd and a DC/AC interface 15da (as schematically illustrated). The HPC units 50 include devices that use larger amounts of electrical power sporadically (either AC or DC), such as electric vehicle charging stations and heat pumps for buildings as well as any specialist industrial equipment used in industrial plants that are part of the microgrid. Each HPC unit 50 may be rated with a peak power consumption and an average power consumption, where the average may be the average while in use. For example, the current draw of an electric vehicle charging station during one car charging event may peak initially and then reduce over time as the car's batteries approach full charge in a predictable manner.

The system 1 additionally includes a controller 70 for controlling the distribution of current in the DC distribution network 10 between the various DC/DC & DC/AC interfaces 15dd, 15da and the bi-directional DC/AC grid interface 30. For controlling DC current flow within the DC distribution network 10, the DC distribution network 10 comprises a switch network 12 with a plurality of switches 14 that are set in an open position or a closed position responsive to a control signal received from the controller 70. Each microgrid component (and/or the associated interface thereto) and the DC/AC grid interface 30 are associated with a switch 14 in the switch network 12 and also a sensing module 16. Each sensing module 16 has suitable measurement elements for measuring electrical parameters, such as current and voltage, and supplying the measurement values to the controller 70. The controller 70 is thus operable to control the switch states of the switches 14 (closed/open) in the switch network 12 responsive to the measurement values it receives from the sensing modules 16, thereby allowing DC current to flow in the DC distribution network 10 in the appropriate directions (and thereby also preventing DC current from flowing in inappropriate directions).

FIG. 1 illustrates all the RES units 60 as being part of the microgrid, i.e. connected to supply direct current to the DC distribution network 10. In a variant of the system, there may be one or more RES units 60 that are geographically dislocated from the DC distribution network 10. These are connected to supply their generated power directly to the AC grid 2 but are under the ambit of the controller 70 for at least some of the control and/or analysis functions described above and further below. While for certain control and analysis purposes any such geographically dislocated RES units 60 are treated as part of the microgrid, for hardware purposes they are separate from the microgrid, i.e. they are not connected directly to the DC distribution network 10.

Figure 2:
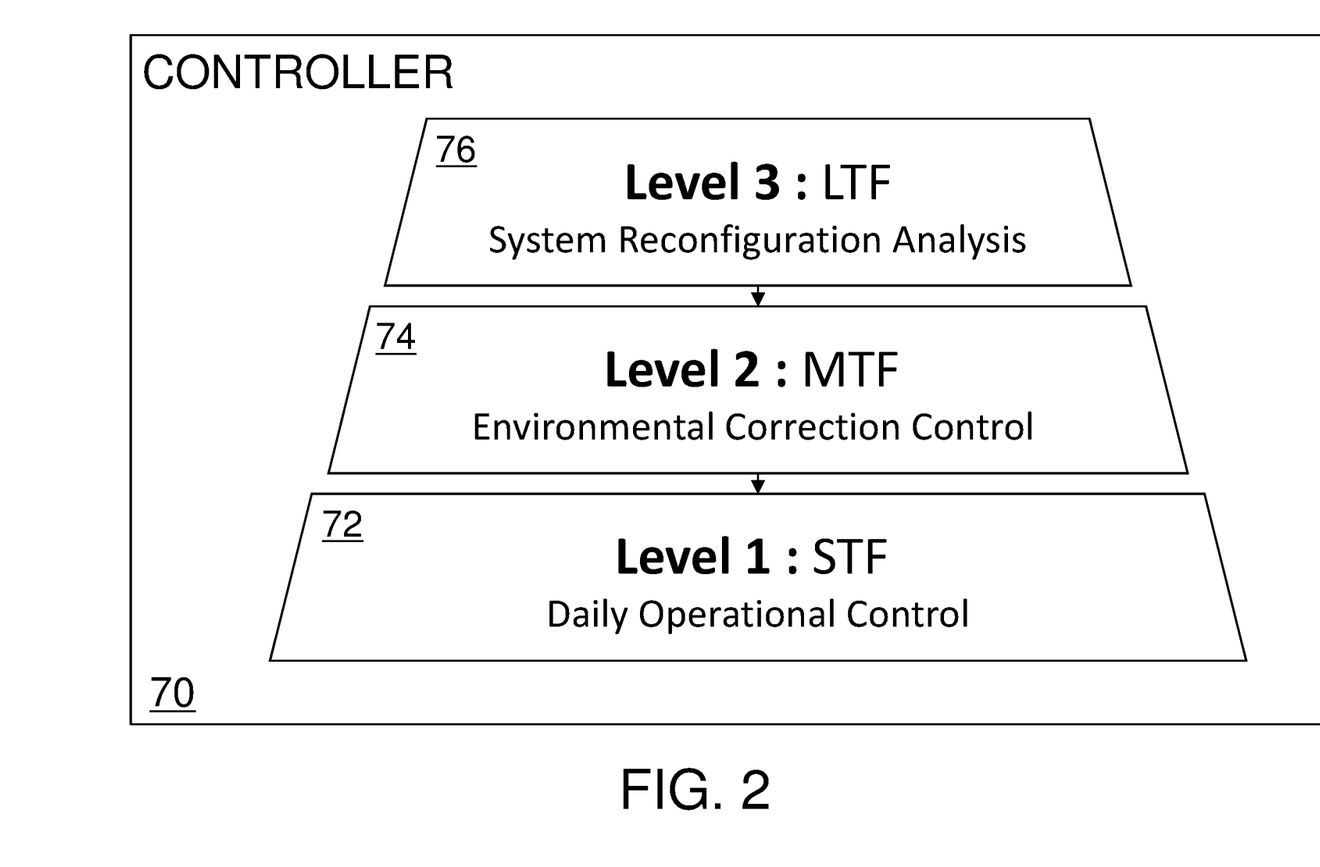
FIG. 2 is a schematic diagram showing further details of the controller.

FIG. 2 is a schematic diagram showing further details of the controller 70. As already mentioned, the controller 70 has the function of controlling the distribution of current in the DC distribution network 10 between the RES units 60, ES units 20, consumer units 40, 50 and AC grid interface 30. The controller 70 also has some analysis functions. The controller 70 has a three tier configuration. The first tier is a short-term time frame (STF) control level 72 for controlling daily operations. The second tier is a medium-term time frame (MTF) control level 74 for making adjustments to the STF control level 72 taking account of supply and demand fluctuations from the RES units 60 and the consumer units 40, 50 respectively to allow environmental corrections to be made. The third tier is a long-term time frame (LTF) analysis level 76 for modelling changes in provision of at least one of RES units 60, ES units 20 and consumer units 40, 50. The modelling period can, for example, be on a quarterly or annual basis. As described in more detail below, the results from the LTF analysis level 76 can be used to make decisions on incrementally increase the provision of RES units 60 and/or ES units 20 as needed to fulfil the aim of reducing the DC distribution networks dependency on the AC grid 2 either in terms of absolute amount of power drawn from the AC grid 2 or net amount of power taking account of what is supplied back to the AC grid 2 by the DC distribution network 10 (and also to the AC grid 2 by any geographically dislocated RES units 60).

The STF control level 72 is configured to control daily operations according to predicted RES unit power generation as a function of time over the day and predicted demand for power from the LPC units 40 and from the HPC units 50 over the day, which may be delivered to the STF control level 72 to use for the current day by the MTF control level 74, e.g. overnight. Absent communication from the MTF control level 74, the STF control level 72 may internally provide these predicted parameters, e.g. on the basis of the actual parameters from the immediately previous day, i.e. yesterday, or from the immediately previous same day of the week, i.e. seven days previously. Since the operational control carried out by the STF control level 72 should be resilient against loss of communication, the STF will have such a default for setting these parameters that does not rely on the MTF control level 74 or any other external input, e.g. using historical data collected by or for the STF control level 72 relating to supply and demand on previous relevant days (e.g. one or more immediately preceding days or one or more immediately preceding same days of the week). The STF control level 72 is configured to satisfy demand from the consumer units 40, 50 as far as possible from the RES units 60 and the ES units 20 rather than from the AC grid 2 while maintaining a specified minimum amount of charge in the ES units 20. Accordingly, the minimum amount of charge is maintained even if this necessitates taking electrical power from the AC grid 2 (via the interface) to do so. The STF control level 72 is further configured to satisfy requested instantaneous demand from the LPC units 40 at all times, i.e. unconditionally, and satisfy requested instantaneous demand from the HPC units 50 conditionally based on the predicted RES unit power generation over the day and the state of charge (SoC) of the ES units 20 while also aiming to minimize average daily electrical power taken from the AC grid 2. (Another option is to configure the STF control level 72 satisfy requested instantaneous demand from the HPC units 50 unconditionally in the sense that it is assumed that sufficient AC grid power is available to do this, whereas in some cases an HPC unit service request must be denied when there is neither sufficient power available within the microgrid nor from the AC grid 2.)

In the usual case of the AC grid interface 30 being bi-directional, the STF control level 72 is beneficially configured to control daily operations so as to preferentially use direct current generated by the RES units 60 to fully charge the ES units 20 before supplying it as electrical power to the AC grid 2. The minimum specified amount of charge stored in the ES units 20 may be a sufficient amount to satisfy demand from the LPC units 40, and optionally a proportion of the HPC units 50, for a set period of time. The minimum specified amount of charge may assume no power generation by the RES units 60. Alternatively, the minimum specified amount of charge may take account of the predicted power generation by the RES units 60 over the day including the timings therefor, so that for example, if the RES units 60 are solar only, then the minimum specified amount of charge would be the greatest at dusk and the lowest just after dawn.

The MTF control level 74 is configured to make adjustments to the STF control level 72 by providing the STF control level 72 with the predicted RES unit power generation on a daily basis as a function of time over the day taking account of factors such as: a forecast for the day, knowledge of the time of year, and the dawn and dusk times. The MTF control level 74 is further configured to make adjustments to the STF control level 72 by providing the STF control level 72 with the predicted demand for power from the LPC units 40 and from the HPC units 50. The predicted demand for power from the LPC units 40 is adjusted based on a computational analysis of actual satisfied demand from the LPC units 40 on previous days, e.g. over one relevant previous STF period, and taking account of daily variations, e.g. over a week. The predicted demand for power from the HPC units 50 is adjusted from day to day based on a computational analysis of actual satisfied demand from the HPC units 50 on previous days and taking account of daily variations within a week. The forecast may comprise a weather forecast for the day that provides useful parameters such as: predicted wind for wind turbines; predicted sunshine for solar panels; predicted effect of rainfall on water courses for mini hydro; and predicted digester performance for biogas generators which may depend on temperature. In an alternative, simpler implementation, instead of having a time-varying target value for the specified minimum amount of charge stored in the ES units 20, i.e. one that varies with the time of day over the day, the MTF control level 74 may provide the STF control level 72 with a fixed daily value for the specified minimum amount of charge to be maintained in the ES units 20 during the whole day according to what is determined to be sufficient for satisfying predicted demand from the LPC units 40 over a period of at least 24 hours. The MTF control level 74 can also incorporate intelligence to predict the requirements of HPC units 50 on a type-by-type basis. For example, if the demand from the HPC unit 50 is to charge a battery, such as in the case of an electric vehicle, the MTF control level 74 may self-learn that a particular HPC unit 50 will have until early morning to charge the battery, e.g. 06:00, when the charging is initiated in the evening, e.g. after 20:00. In the example of vehicle battery charging, the user may via an app specify how the battery should be charged by, e.g. car not needed until tomorrow morning at 08:00, or charge immediately without delay. This information can be communicated to the STF control level 72, in which case the STF control level 72 can manage the charging process on that basis rather than through a prediction from the MTF control level 74.

The LTF analysis level 76 is configured to model possible changes to the DC distribution network 10 from its present state in order to analyse adequacy of provision by the ES units 20 and the RES units 60 for satisfying demand from the consumer units 40, 50. This may be demand taking account only the consumer units 40, 50 that are at present part of the microgrid or may be demand taking account of planned changes to the number of consumer units through new build or increased provision of electric vehicle charging points, for example. The LTF analysis level 76 is configured to model the effect of varying the number of ES units 20 and RES units 60 (away from the actual numbers that are currently part of the microgrid). The modelling can therefore predict how varying the number of ES units 20 and RES units 60 affects the amount of electrical power taken from the AC grid 2. The variations will in most cases be increments from the current provision but in principle the variations could be decrements, e.g. if a high-power-consuming industrial consumer unit was closing down in the near future. The amounts calculated by the model may include net amounts (e.g. average net amount of AC grid power taken over time periods such as a day, a week or a month) and peak amounts taken from the AC grid 2 (e.g. peak amount of power taken from the AC grid 2 at any one time during a relevant time period such as a day, a week or a month). The modelled amounts may be compared with the actual amounts for the corresponding parameters based on historical data for the microgrid. Moreover, historical data on unsatisfied demand from HPC units 50 may on occasion be useful in case the control system is configured to deny servicing demand from HPC units 50 when insufficient power is available from the microgrid. Specifically, the modelling may take account of values for satisfied demand from the LPC units 40 and satisfied demand from the HPC units 50 (as well as optionally values for any unsatisfied HPC unit demand) These values may take account of daily, weekly and monthly variations thereof (optionally including a different number of LPC units 40 and HPC units 50 to those that constitute the DC distribution network 10). The model can therefore provide as output different scenarios showing the predicted effect of changing the number of ES units 20 and/or the number of RES units 60 from the numbers of these units that the microgrid currently possesses. The model may also incorporate deviations from the actual current number of LPC and HPC units 50. For example, in the case that the microgrid covers a small town, the model can incorporate the effect of building a new housing development, expanding a business park or adding more HPC units 50, such as more heat pumps or electric vehicle charging points, and thereby provide data on how many additional ES and RES units 60 need to be added to the microgrid in order for the demand for electricity from the AC grid 2 to remain unaltered. Each modelled scenario may cover any relevant time period, which will typically be at least a year, but may be a shorter period such as one or more quarters. The modelling can take actual recorded values from historical usage or predicted values provided by the MTF control level 74. Taking predicted values from the MTF control level 74 has the advantage that, providing the DC distribution network 10 has been running for some time, e.g. several months, the MTF predictions will already indirectly incorporate historical behavior of the microgrid. In the usual case, in which the DC distribution network 10 has a bi-directional interface to the AC grid 2, the LTF analysis level 76 may operate such that the amount of electrical power taken from the AC grid 2 is a net amount taking account of electrical power supplied to the AC grid 2 by the DC distribution network 10 as well as electrical power supplied to the AC grid 2 by the DC distribution network 10 and, if present, electrical power supplied to the AC grid 2 by geographically dislocated RES units 60 operated by the microgrid provider. The net amount can be positive or negative, where a negative net amount indicates that the DC distribution network 10 is supplying more power to the AC grid 2 than it is taking.

The STF and MTF control levels may be jointly configured such that the STF control level 72 controls daily operations according to a time-varying target value for the specified minimum amount of charge to be maintained in the ES units 20, which varies over the day. The MTF control level 74 makes regular adjustments to the STF control level 72, e.g. at daily or weekly intervals, by providing the STF control level 72 with the time-varying target value for the specified minimum amount of charge to be maintained in the ES units 20 that minimizes average daily electrical power taken from the AC grid 2 while taking account of the predicted demand for power from the LPC units 40 and from the HPC units 50.

The controller 70 may subdivide the HPC units 50 into one or more device specific subclasses plus a miscellaneous subclass containing all LPC units 40 which have no specific subclass of their own. Specifically, electric vehicle charging points may be classified as one type of HPC unit 50. Heat pumps for homes, office buildings or other installations may be classified as another type of HPC unit 50. This subdivision allows the controller 70 to manage demand for power from each HPC unit subclass independently in each of the STF control level 72, MTF control level 74 and LTF analysis level 76.

It can be useful to configure the MTF control level 74 to calculate a predicted demand for power from the AC grid 2 over the day. The MTF control level 74 can adjust this predicted demand for power based on a computational analysis of actual demand for power from the AC grid 2 on previous days and taking account of daily variations within a week. The predicted demand of the microgrid for the next day can be communicated by the microgrid controller 70 to a controller 70 of the AC grid 2 (not shown). The predicted demand can then be used by the AC grid 2 controller 70 to ensure security of supply to the microgrid from the AC grid 2, i.e. to ensure that for the next day the AC grid 2 makes available to the microgrid at least the amount of power that the microgrid has communicated to the AC grid 2 controller 70 that it will (or may) need. The communication between microgrid and AC grid 2 may be effected by the controller 70 incorporating, or having access to, a suitable transmitter or transceiver as schematically illustrated in FIG. 1.

It will be appreciated that the different levels of the controller 70 may be physically distributed. The STF control level 72 functions need to be embedded in the microgrid, preferably by direct electrical wiring, so that operation of the STF control level 72 to control daily operations of the DC distribution network 10 does not require any communications other than optionally through the power lines of the DC distribution network 10 itself. Operation of the STF control level 72 in at least one mode of operation thus has no dependency on the Internet, on mobile communications network (e.g. 4G or 5G) or on any local wireless network. The STF control level 72 may additionally have one or more emergency modes of operation which it adopts in response to an external event such as loss of communication to the MTF control level 74, loss of connection to the Internet, loss of connection to a mobile communications network, or in response to receipt of a message from the MTF control level 74 which may be sent if the MTF control level 74 becomes aware of loss of critical external infrastructure elements. The MTF control level 74 may also be embedded with the STF control level 72, e.g. may be implemented as programmed hardware physically integrated with the STF control level 72 on a common motherboard. Alternatively, the MTF control level 74 may be implemented as a separate computer device that is connected, either wired or wirelessly, e.g. as part of a local area network (LAN), with the hardware realisation of the LTF analysis level 76. The MTF control level 74 may in some cases be remote from the microgrid entirely and only connected via the Internet or a mobile communications network. The LTF analysis level 76 will typically be realized remotely, e.g. according to a known service model such as software-as-a-service (SaaS), Platform as a Service (PaaS) or Infrastructure as a Service (IaaS). The LTF analysis level 76 may be implemented entirely as a computer program, i.e. in software, which communicates with the MTF control level 74 and optionally also STF control level 72 via suitable LAN, Internet or mobile communications network connections. The MTF control level 74 and the STF control level 72 may incorporate electronic circuitry including, for example, programmable logic circuitry, field-programmable gate arrays (FPGA), or programmable logic arrays (PLA) to execute computer readable program instructions by utilizing state information of the computer readable program instructions to personalize the electronic circuitry, in order to perform their respective functions.

The above-described three-level control is predicated on the assumption that the RES units 60 are generators of 'green' energy, i.e. energy that is produced without burning fossil fuels, whereas the AC grid 2 takes electricity generated from polluting or potentially polluting sources such as by burning fossil fuel. The goal of the microgrid is to be independent of the AC grid 2 or at least to rely on electricity from the AC grid 2 in predictable amounts—both average and peak—and with predictable timing. Over an extended time period or weeks or months, the MTF control level 74 aims to configure the STF control level 72 so the microgrid's use of AC grid power follows an environmentally desirable, time-dependent function. The configuration of the STF control level 72 should therefore after some time settle on a configuration that ensures that both average and peak amounts of electricity taken from the AC grid 2 are predictable over the course of each day and also over the course of normal weekly fluctuations, e.g. taking account of differences in consumer behavior on weekdays and at the weekend. The configuration of the STF control level 72 may also take account of the supply of excess electricity from the microgrid to the AC grid 2 with the aim of partially or wholly offsetting any electricity taken from the AC grid 2. The role of the LTF analysis level 76 is to propose incremental (or decremental) configuration changes, e.g. to acquire additional ES and/or RES units 60 to achieve the goal of zero carbon dioxide emission for the electricity used by the microgrid's consumer units 40, 50, which may be equated with the average amount of electricity that the microgrid takes from the AC grid 2 being zero, either absolutely zero or net zero taking account of the electricity supplied from the microgrid to the AC grid 2. The modelling can use any known mathematical and/or statistical methods including artificial intelligence.

Figure 3:
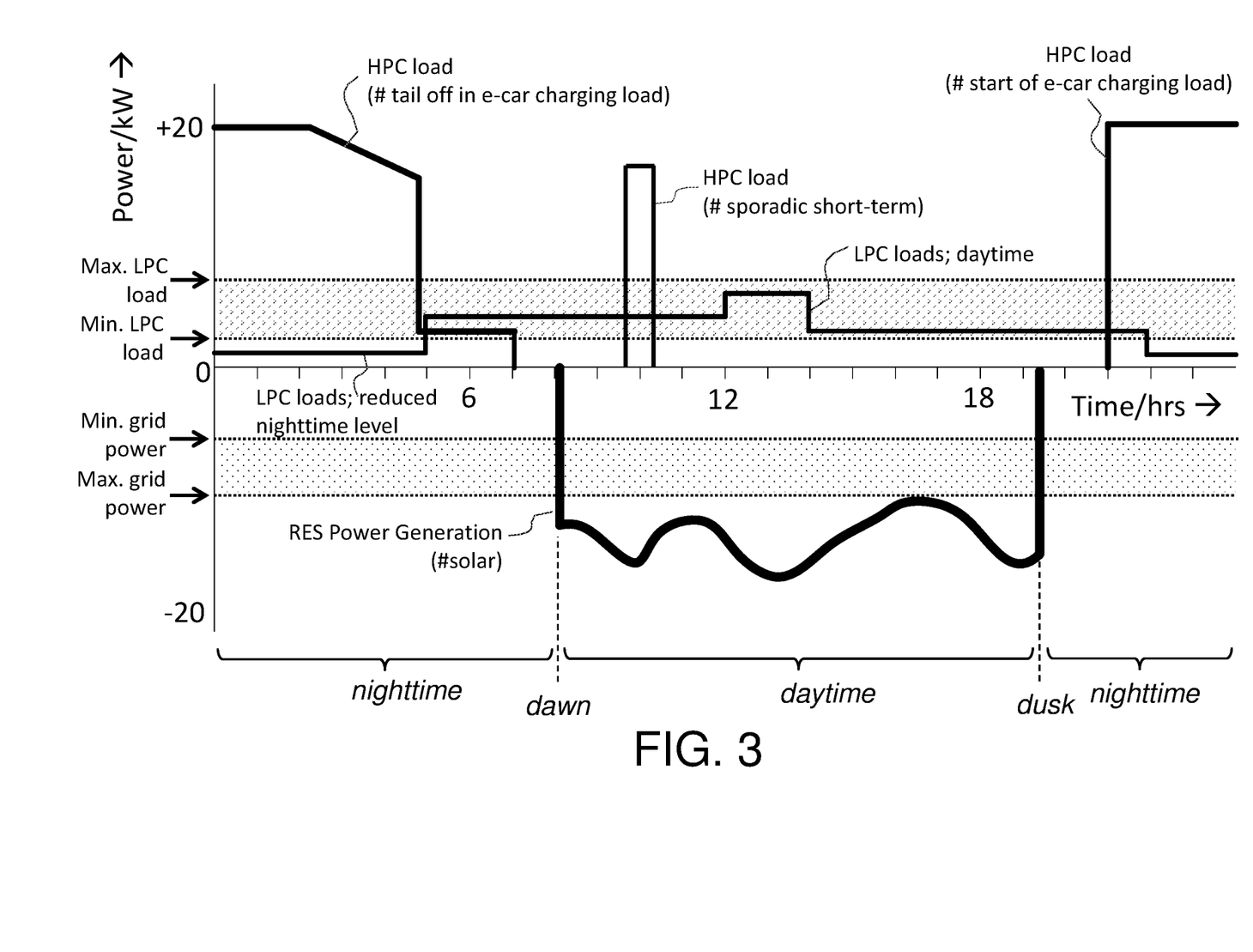
FIG. 3 is a schematic diagram showing a simplified example of possible supply and demand fluctuations over a day for the microgrid.

FIG. 3 is a simplified schematic diagram showing an example of possible supply and demand fluctuations over a day. By way of example, only solar RES units 60 are considered. Solar panels do not generate power at night and generate variable amounts of power in the daytime. Similar supply fluctuations from wind turbines can be envisaged. The LPC units 40 collectively represent a varying load that has a reduced level at night-time, or at least during normal sleep periods. During the daytime, the LPC units 40 collectively have a varying load that varies between a minimum value and a maximum value; the band of LPC loading is shown with stippling. The AC grid 2 guarantees to make available at least a minimum amount of grid power at all times as well as allowing larger amounts of power, up to a maximum amount of grid power, to be taken when available. The range of available grid power between the guaranteed minimum and the possible maximum are shown with stippling. To ensure security of supply to the LPC units 40, it is necessary for the guaranteed minimum amount of grid power to exceed the maximum amount of LPC load. A single example short-term HPC load is also shown at around 10 a.m., e.g. from a heat pump. An example electric vehicle charging event is also shown, where typically an electric vehicle will be charged from a low battery unit state of charge, initially taking a maximum amount of power. The amount of power drawn by the charging battery unit of the car will then reduce over time as the battery unit approaches full charge as shown schematically between 02:00 and 05:00 hours.

Figure 4:
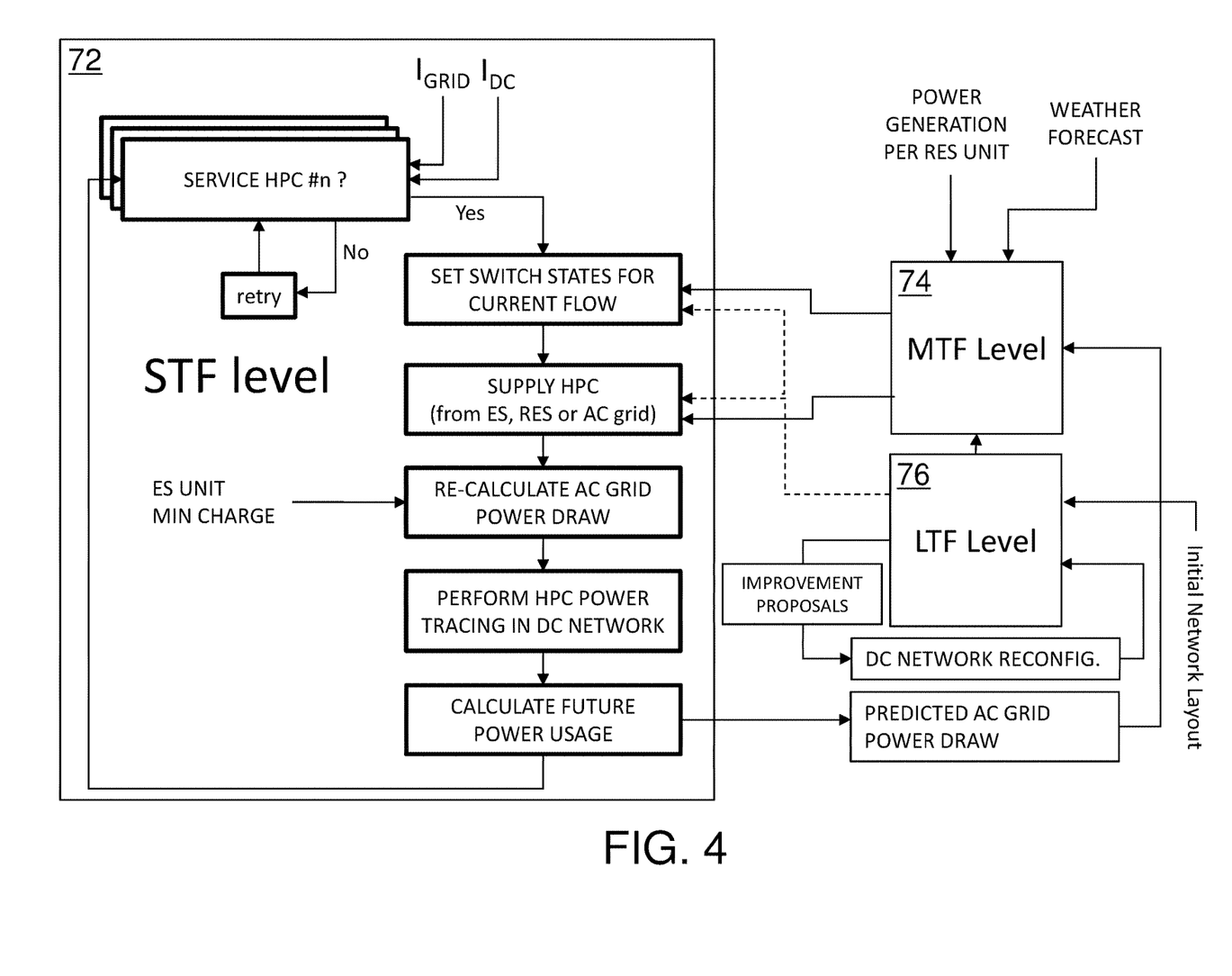
FIG. 4 is a schematic block diagram showing an example control process flow for servicing HPC supply requests within the controller of FIG. 2.

FIG. 4 is a schematic block diagram showing an example control process flow for servicing HPC supply requests within the controller 70 of FIG. 2 with its three levels; STF control level 72, MTF control level 74 and LTF analysis level 76. On receipt of a request to service an HPC unit 50, e.g. when an electric vehicle is plugged into a charging station, it is checked whether there is sufficient excess power available in (or to) the DC distribution network 10 having regard to factors including one or more of the following: aggregate charge in the ES units 20 above the reserved minimum amount of charge to be retained in the ES units 20; instantaneous RES power generation by the RES units 60; maximum current that can be drawn by the microgrid from the AC grid 2 less current draw that is already committed to from existing ongoing HPC service requests and a reserve for servicing LPC unit requests. If it is decided that the HPC unit request cannot be serviced ('No' branch), then a retry loop is entered into, so that the HPC unit request is periodically resubmitted. If it is decided that the HPC unit request can be serviced ('Yes' branch), then the following actions are carried out.

Any necessary reconfiguration of the switch network 12 is carried out to ensure proper current flow through the DC distribution network 10 generally and specifically to the HPC unit 50 to be serviced.

The HPC unit 50 is then supplied with DC current. This may be from an ES unit 20. However, DC current may also be made available from an RES unit 60, if there is excess power generation, since it is more efficient, i.e. less lossy, to use the RES generated power directly rather than using it to charge an ES unit 20 while simultaneously drawing DC current from that (or another) ES unit 20. If needed, and depending on the control parameters, current may also be made available from the AC grid 2. This may for example be the case if there is a deficit of RES power generation at the present time and the ES units 20 are at or close to their reserved minimum amount of charge and it is also decided through control logic that the HPC unit request should be serviced (rather than not serviced) notwithstanding the fact that it will require AC grid power.

From time to time while servicing each HPC unit request a re-calculation is performed to re-evaluate whether and how much power to draw from the AC grid power having regard to maintaining the stipulated minimum amount of charge in the ES units 20 (which will itself generally be a time-varying amount). Here it is noted that an HPC unit request, such as charging an electric vehicle, may have a duration of several hours, perhaps up to 8-12 hours, depending on the rate of charging.

While servicing each HPC unit request, power tracing is carried out from time to time (or continuously). The power tracing can be used to adjust how demand from the HPC units 50 is met. In particular, to preferentially supply HPC units 50 directly with power being generated by the RES units 60 rather than by drawing power from the ES units 20.

The power tracing is used as input by a control algorithm for logging actual, and predicting future, power usage of ongoing HPC unit requests including from the new HPC unit request. Based on the predicted power usage from the ongoing HPC unit requests, this control algorithm outputs values of predicted power draw from the AC grid 2 (both maximum, i.e. peak, and average) to the MTF control level 74.

Turning to the LTF analysis level 76, this receives an initial layout of the DC distribution network 10 to start its operation. Over time the LTF analysis level 76 will propose updates to the DC distribution network 10 either based on the existing network layout or a modified network layout which includes additional external input on planned changes to the network layout, e.g. new RES capacity coming on line, or new build of additional consumer units 40, 50. These factors may of course interact with each other in that improvement proposals that are the outcome of modelling by the LTF analysis level 76 may be realized through new provision of RES units 60, ES units 20, LPC units 40 or HPC units 50 as well as re-definition through contractual arrangement of the maximum and average current that is guaranteed to be made available to the microgrid from the AC grid 2.

Turning to the MTF control level 74, this receives the above-mentioned information on predicted AC grid power draw from the STF control level 72. It also receives data on the power being currently generated by each of the RES units 60. Furthermore, it receives a weather forecast for the day ahead and optionally for longer periods, e.g. 7 or 10 days, providing predictions of weather conditions (sun, wind, temperature) that are relevant for the RES unit power generation and to a lesser extent ES unit performance given that batteries will have higher internal losses when the ambient temperature is lower, especially when below freezing.

Finally, the dashed lines from the LTF analysis level 76 to the STF control level 72 show optional connections that may be useful in case the LTF analysis level 76 has information on network reconfiguration that is relevant for immediate STF control, e.g. that on a particular day a new RES unit 60 or ES unit 20 will enter operation or an existing RES unit 60 or ES unit 20 will be taken offline for servicing. This can provide for more efficient control by the STF control level 72 compared with waiting for this information to filter through to the STF control level 72 via the MTF control level 74. Here it is noted that the LTF analysis level 76 with this option is also acting as a control level.

Figure 5:
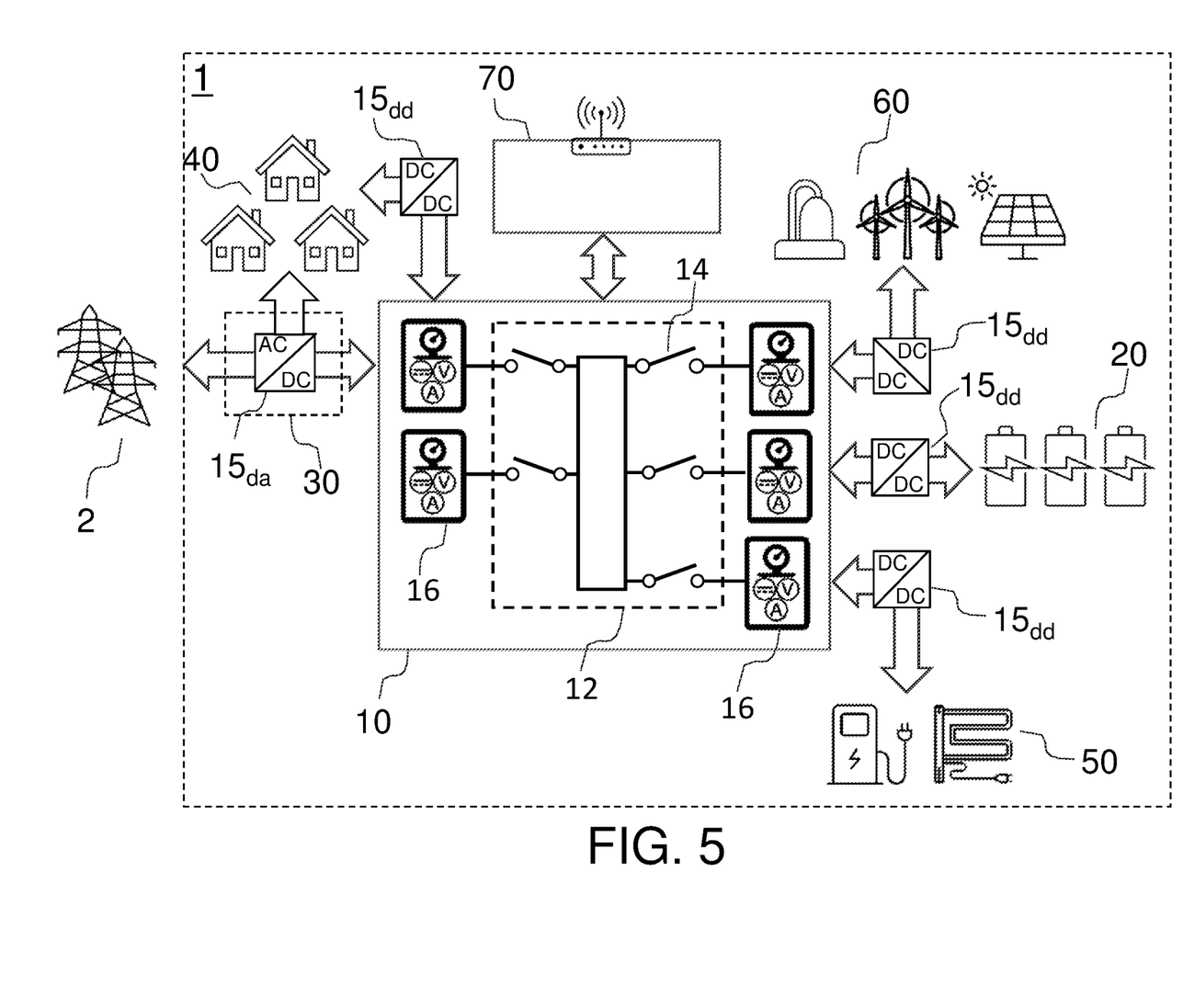
FIG. 5 is a schematic diagram of a microgrid electricity supply system according to a further embodiment of the invention.

FIG. 5 is a schematic diagram of a microgrid electricity supply system according to a further embodiment of the invention. This embodiment differs from that of FIG. 1 only in the manner in which the DC distribution network 10 connects to the external AC grid 2 through a suitable DC/AC interface 30. A modified DC/AC switch, i.e. an inverter, which is controlled to allow switching of current flow direction between the AC LPCs 40 (i.e. AC appliances or equipment of the LPCs), the AC grid 2 and the DC distribution network 10. The DC LPCs (i.e. DC appliances or equipment of the LPCs) are connected to the DC distribution network through a DC/DC interface 15*dd* as in the embodiment of FIG. 1. The voltage amplitude at the DC/AC interface 30 is varied to be slightly above or below the AC grid voltage amplitude, e.g. with a difference of between 5-10 V, so that the controller 70 can easily switch between a mode of operation in which current is drawn from the AC grid 2 and a further mode of operation in which current is drawn from an inverter 15*da* that, in turn, draws power from the DC distribution network 10, e.g. from one or more of the RES units 60 and/or ES units 20. The AC LPCs are thus supplied either from the AC grid 2 or from the DC distribution network 10 depending on the voltage amplitude difference between the AC grid voltage and the grid-facing output voltage from the inverter 15*da*.

Figure 6:
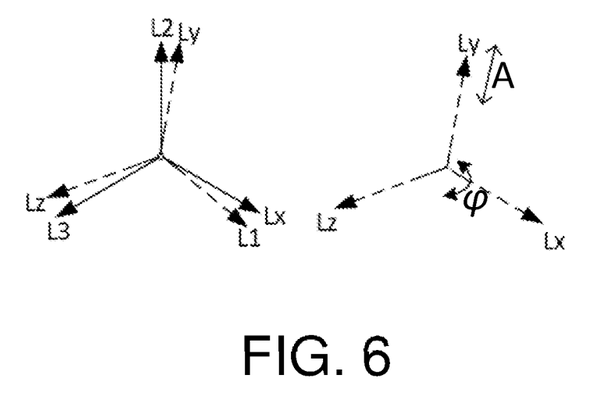
FIG. 6 is a schematic depiction of 3-phase AC grid voltage overlaid with 3-phase voltage output from an inverter to provide AC output from the DC distribution network as performed in the embodiment of FIG. 5.

FIG. 6 is a schematic drawing which on the right-hand side depicts only the 3-phase voltage as output from an inverter 15*da* to provide AC output from the DC distribution network 10 as performed in the embodiment of FIG. 5. The left-hand side shows the inverter output (dashed lines) as shown in the right-hand side overlaid on the 3-phase AC grid voltage from the AC grid 2 (solid lines). As shown schematically in FIG. 6, switching control at the DC/AC interface 30 is achieved in this embodiment through variable control of the amplitude, A, and phase, φ, of the inverter output—Lx, Ly, Lz—in relation to the amplitude and phase of the AC grid voltage—L1, L2, L3. Matching of impedance may also be achieved through control of the inverter's 15*da* phase shift to the grid voltage. The switch network 12 is controlled appropriately to ensure both steady state operation of each of the above modes and also to manage the switching between operational modes. In particular, the switch network 12 is controlled by the controller 70 to provide for synchronization at the AC grid interface 30 between the AC grid 2 and the output of inverter 15*da* used to supply AC LPCs 40 from the DC distribution network 10, synchronization being relevant for example whenever the supply of AC users is changed from the AC grid 2 to the DC distribution network 10 (via inverter 15*da*) or vice versa.

A number of operational modes are possible by appropriate control and switching of the inverter 15*da* and the switches 14 of the switching network 12, including by way of example the following:

Mode 1: Grid Supply of AC LPCs:
U_inverter<U_grid i) AC LPCs supplied from AC grid;
  ii) DC LPCs & DC HPCs supplied from RES units and/or ES units.
Mode 2: Grid Supply of AC LPCs & DC Distribution Network Including ES Units
Univerter<U_grid: i) AC LPCs, DC LPCs & DC HPCs supplied from AC grid;
  ii) ES unit charging from AC grid.
Mode 3: Microgrid Supply of AC LPCs (without Supply Back to AC Grid)
U_inverter>U_grid: i) AC LPCs supplied by DC distribution network, i.e. from RES units and/or ES units;
  ii) AC grid on standby only and not actively involved.
Mode 4: Microgrid Supply (with Supply Back to AC Grid)
U_inverter>U_grid: i) AC LPCs, DC LPCs & DC HPCs supplied by DC distribution network, i.e. RES units and/or ES units;
  ii) DC distribution network supplying power back to AC grid from RES units and/or ES units.

In summary of FIG. 5 & FIG. 6, AC consumers such as the AC LPCs can be selectively supplied either from the DC distribution network 10, e.g. with power from the ES units 20, or from the AC grid 2 through control of the voltage amplitude of the inverter 15*da* contained in the AC grid interface 30 with further control for grid synchronization, as well as matching of impedance, being achieved through control of the inverter's 15*da* phase shift to the grid voltage.

In summary of the above, we have described a controller for a DC microgrid and associated RES units, as well as a corresponding DC microgrid. The DC microgrid comprises ES units and consumer units that are interconnected by a DC distribution network. The DC microgrid is connected to an AC grid, typically the national grid, to allow power to flow between the DC microgrid and the AC grid. The controller has three levels: a first for controlling daily operations, a second for making optimizing adjustments to the first level control based on historical data and the weather forecast, and a third which is an analysis level for modelling how changes in provision of the number of RES units and ES units would affect the DC microgrid's dependency on power from the AC grid. The output of the third level thus enables incremental changes to be made to provision in order to reduce, ideally eliminate, the net power demand from the AC grid.

What is claimed is:
1. An electricity supply system comprising: a DC distribution network;
  a plurality of energy storage, (ES) units connected to the DC distribution network via DC/DC interfaces and which are operable to be charged with direct current from the DC distribution network and to discharge direct current to the DC distribution network via their DC/DC interfaces;
  an AC grid interface connecting the DC distribution network to an external AC grid, the AC grid interface being configured to enable the DC distribution network to take electrical power from the AC grid; a plurality of consumer units connected to the DC distribution network via one or more DC/DC or DC/AC interfaces depending on whether they are DC or AC devices, the consumer units comprising low power consumer, (LPC), units and high power consumer, (HPC), units; a plurality of renewable energy source, (RES), units; and
  a controller for controlling the DC distribution network, the controller having a short-term time frame, (STF), control-level for controlling daily operations, a medium-term time frame, (MTF), control level for making adjustments to the STF control level taking account of predicted supply and demand fluctuations from the RES units and the consumer units respectively, and a long-term time frame, (LTF), analysis level for modelling changes in provision of at least one of the RES units, the ES units, and the consumer units,
  wherein the STF control level is configured to control daily operations according to:
  predicted RES unit power generation as a function of time over the day; and
  predicted demand for power from the LPC units and the HPC units over the day; in order to satisfy demand from the consumer units as far as possible from the RES units and the ES units rather than from the AC grid while maintaining a specified minimum amount of charge in the ES units, if needed by taking electrical power from the AC grid via the AC grid interface;

satisfy requested instantaneous demand from the LPC units at all times; and satisfy requested instantaneous demand from the HPC units over the day conditionally based on the predicted RES unit power generation and the state of charge of the ES units;

while minimizing average daily electrical power taken from the AC grid, wherein the MTF control level is configured to make adjustments to the STF control level:

by providing the STF control level with the predicted RES unit power generation on a daily basis as a function of time over the day; and by providing the STF control level with the predicted demand for power from the LPC units and from the HPC units, wherein the predicted demand for power from the LPC units is adjusted based on a computational analysis of actual satisfied demand from the LPC units on previous days and taking account of daily variations within a week, and wherein the predicted demand for power from the HPC units is adjusted from day to day based on a computational analysis of actual satisfied demand from the HPC units on previous days and taking account of daily variations within a week, and wherein the LIT analysis level is configured to model possible changes to the DC distribution network:

to analyze adequacy of provision by the ES units and the RES units for satisfying demand from the LPC units and the HPC units by modelling the effect of varying the number of ES units and RES units on the amount of electrical power taken from the AC grid taking account of values for: satisfied demand from the LPC units; and satisfied demand from the HPC units; taking account of daily, weekly and monthly variations thereof to output one or more scenarios with changes in the number of ES units and the number of RES units showing for each scenario the amounts of electrical power taken from the AC grid over a period of at least two months.

2. The system of claim 1, wherein the STF control level is further configured to control daily operations according to a time-varying target value for the specified minimum amount of charge to be maintained in the ES units, which varies over the day, wherein the MTF control level is further configured to make adjustments to the STF control level: by providing the STF control level with the time-varying target value for the specified minimum amount of charge to be maintained in the ES units that minimizes average daily electrical power taken from the AC grid while taking account of the predicted demand for power from the LPC units and from the HPC units.

3. The system of claim 1, wherein the STF control level is configured to control daily operations to satisfy demand from the consumer units as far as possible directly from power being generated by the RES units rather than by drawing power from the ES units.

4. The system of claim 1, wherein the MTF control level is configured to determine the predicted RES unit power generation taking account of a weather forecast for the day.

5. The system of claim 1, wherein the HPC units are subdivided into electric vehicle charging points and other HPC units, with demand for power being subdivided correspondingly in each of the STF, MTF and LTF control and analysis levels.

6. The system of claim 1, wherein the AC grid interface connecting the DC distribution network to an external AC grid is additionally configured to enable the DC distribution network to supply direct current as electrical power to the AC grid.

7. The system of claim 6, wherein, in the LTF analysis level, the amount of electrical power taken from the AC grid computed by the LTF analysis level is a net amount taking account also of electrical power supplied to the AC grid from the RES units.

8. The system of claim 1, wherein the MTF control level is additionally configured to calculate a predicted demand for power from the AC grid over the day.

9. The system of claim 8, wherein, in the MTF control level, the predicted demand for power from the AC grid over the day is adjusted based on a computational analysis of actual demand for power from the AC grid on previous days and taking account of daily variations within a week.

10. The system of claim 1, wherein the RES units are connected to supply direct current to the DC distribution network.

11. The system of claim 1, wherein at least some of the RES units are geographically dislocated from the DC distribution network and are connected to supply their generated power to the AC grid independently of the DC distribution network.

12. The system of claim 1, wherein the HPC units include DC devices that are connected to the DC distribution network via DC/DC interfaces.

13. A controller for controlling a DC distribution network and a plurality of renewable energy source, (RES), units, the DC distribution network comprising;

a plurality of energy storage, (ES), units connected to the DC distribution network via DC/DC interfaces and which are operable to be charged with direct current from the DC distribution network and to discharge direct current to the DC distribution network via their DC/DC interfaces;

an AC grid interface connecting the DC distribution network, to an external AC grid, the AC grid interface being configured to enable the DC distribution network to take electrical power from the AC grid; a plurality of consumer units connected to the DC distribution network via one or more DC/DC or DC/AC interfaces depending on whether they are DC or AC devices, the consumer units comprising low power consumer, (LPC), units and high power consumer, (HPC), units;

wherein the controller comprises a short-term time frame, (STF), control level for controlling daily operations, a medium-term time frame, (MTF), control level for making adjustments to the STF control level taking account of predicted supply and demand fluctuations from the RES units and the consumer units respectively, and a long-term time frame, (LTF), analysis level for modelling changes in provision of at least one of the RES units, the ES units, and the consumer units, wherein the STF control level is configured to control daily operations according to:

predicted RES unit power generation as a function of time over the day; and predicted demand for power from the LPC units and the HPC units over the day; in order to satisfy demand from the consumer units as far as possible from the RES units and the ES units rather than from the AC grid while maintaining a specified minimum amount of charge in the ES units, if needed by taking electrical power from the AC grid via the AC grid interface;

satisfy requested instantaneous demand from the LPC units at all times; and satisfy requested instantaneous demand from the HPC units over the day conditionally based on the predicted RES unit power generation and the state of charge of the ES units;
while minimizing average daily electrical power taken from the AC grid,
wherein the MTF control level is configured to make adjustments to the STF control level:
by providing the STF control level with the predicted RES unit power generation on a daily basis as a function of time over the day; and
by providing the STF control level with the predicted demand for power from the LPC units and from the HPC units, wherein the predicted demand for power from the LPC units is adjusted based on a computational analysis of actual satisfied demand from the LPC units on previous days and taking account of daily variations within a week, and wherein the predicted demand for power from the HPC units is adjusted from day to day based on a computational analysis of actual satisfied demand from the HPC units on previous days and taking account of daily variations within a week, and
wherein the LTF analysis level is configured to model possible changes to the DC distribution network:
to analyze adequacy of provision by the ES units and the RES units for satisfying demand from the LPC units and the HPC units by modelling the effect of varying the number of ES units and RES units on the amount of electrical power taken from the AC grid taking account of values for: satisfied demand from the LPC units; and satisfied demand from the HPC units; taking account of daily, weekly and monthly variations thereof to output one or more scenarios with changes in the number of ES units and the number of RES units showing for each scenario the amounts of electrical power taken from the AC grid over a period of at least two months.

14. An electricity supply system comprising; a DC distribution network;
a plurality of energy storage, (ES), units connected to the DC distribution network via DC/DC interfaces and which are operable to be charged with direct current from the DC distribution network and to discharge direct current to the DC distribution network via their DC/DC interfaces;
an AC grid interface connecting the DC distribution network to an external AC grid, the AC grid interface being configured to enable the DC distribution network to take electrical power from the AC grid; a plurality of consumer units connected to the DC distribution network via one or more DC/DC or DC/AC interfaces depending on whether they are DC or AC devices, the consumer units comprising low power consumer, (LPC), units and high power consumer, (HPC), units;
a plurality of renewable energy source, (RES), units; and
a controller for controlling the DC distribution-network, the controller having a short-term time frame, (STF), control level for controlling daily operations and a medium-term time frame, (MTF), control level for making adjustments to the STF control level taking account of predicted supply and demand fluctuations from the RES units and the consumer units respectively,
wherein the STF control level is configured to control daily operations according to:
predicted RES unit power generation as a function of time over the day;
predicted demand for power from the LPC units and from the HPC units over the day; and a time-varying target value for the specified minimum amount of charge to be maintained in the ES units, which varies over the day;
in order to satisfy demand from the consumer units as far as possible from the RES units and the ES units rather than from the AC grid while maintaining a specified minimum amount of charge in the ES units, if needed by taking electrical power from the AC grid via the AC grid interface;
satisfy requested instantaneous demand from the LPC units at all times; and
satisfy requested instantaneous demand from the HPC units over the day conditionally based on the predicted RES unit power generation and the state of charge of the ES units;
while minimizing average daily electrical power taken from the AC grid, and wherein the MTF control level is configured to make adjustments to the STF control level:
by providing the STF control level with the predicted RES unit power generation on a daily basis as a function of time over the day;
by providing the STF control level with the predicted demand for power from the LPC units and from the HPC units, wherein the predicted demand for power from the LPC units is adjusted based on a computational analysis of actual satisfied demand from the LPC units on previous days and taking account of daily variations within a week, and wherein the predicted demand for power from the HPC units is adjusted from day to day based on a computational analysis of actual satisfied demand from the HPC units on previous days and taking account of daily variations within a week; and
by providing the STF control level with the time-varying target value for the specified minimum amount of charge to be maintained in the ES units that minimizes average daily electrical power taken from the AC grid while taking account of the predicted demand for power from the LPC units and from the HPC units.

15. A controller for controlling a DC distribution network and a plurality of renewable energy source, (RES), units, the DC distribution network comprising;
a plurality of energy storage, (ES), units connected to the DC distribution network via DC/DC interfaces and which are operable to be charged with direct current from the DC distribution network and to discharge direct current to the DC distribution network via their DC/DC interfaces;
an AC grid interface connecting the DC distribution network to an external AC grid, the AC grid interface being configured to enable the DC distribution network to take electrical power from the AC grid; a plurality of consumer units connected to the DC distribution network via one or more DC/DC or DC/AC interfaces depending on whether they are DC or AC devices, the consumer units comprising low power consumer, (LPC), units and high power consumer, (HPC), units;
wherein the controller comprises a short-term time frame, (STF), control level for controlling daily operations and a medium-term time frame, (MTF), control level for making adjustments to the STF control level taking account of predicted supply and demand fluctuations from the RES units and the consumer units respectively, wherein the STF control level is configured to control daily operations according to:

predicted RES unit power generation as a function of time over the day;

predicted demand for power from the LPC units and from the HPC units over the day;

a time-varying target value for the specified minimum amount of charge to be maintained in the ES units, which varies over the day; and in order to satisfy demand from the consumer units as far as possible from the RES units and the ES units rather than from the AC grid while maintaining a specified minimum amount of charge in the ES units, if needed by taking electrical power from the AC grid via the AC grid interface;

satisfy requested instantaneous demand from the LPC units at all times;

satisfy requested instantaneous demand from the HPC units over the day conditionally based on the predicted RES unit power generation and the state of charge of the ES units;

while minimizing average daily electrical power taken from the AC grid, and wherein the MTF control level is configured to make adjustments to the STF control level:

by providing the STF control level with the predicted RES unit power generation on a daily basis as a function of time over the day;

by providing the STF control level with the predicted demand for power from the LPC units and from the HPC units, wherein the predicted demand for power from the LPC units is adjusted based on a computational analysis of actual satisfied demand from the LPC units on previous days and taking account of daily variations within a week, and wherein the predicted demand for power from the HPC units is adjusted from day to day based on a computational analysis of actual satisfied demand from the HPC units on previous days and taking account of daily variations within a week; and by providing the STF control level with the time-varying target value for the specified minimum amount of charge to be maintained in the ES units that minimizes average daily electrical power taken from the AC grid while taking account of the predicted demand for power from the LPC units and from the HPC units.

* * * * *